United States Patent [19]

Huber

[11] 4,080,050
[45] Mar. 21, 1978

[54] DEVICE FOR ADJUSTING THE COMPOSITION OF THE SPECTRUM OF A LIGHT BEAM USING CAM PLATES, TRACTION CABLE ARRANGEMENT

[75] Inventor: Ernst Huber, Wettingen, Switzerland

[73] Assignee: Gretag Aktiengesellschaft, Regensdorf, Switzerland

[21] Appl. No.: 744,093

[22] Filed: Nov. 22, 1976

[30] Foreign Application Priority Data

Nov. 29, 1975 Switzerland .................. 15469/75

[51] Int. Cl.$^2$ ................ G02B 5/22; G02B 7/00; G02B 5/28
[52] U.S. Cl. .................. 350/315; 350/317; 350/318; 350/166
[58] Field of Search ............. 350/315, 316, 314, 311, 350/166, 317, 318; 355/35

[56] References Cited

U.S. PATENT DOCUMENTS

| 562,642 | 6/1896 | McDonough | 350/316 |
|---|---|---|---|
| 1,127,763 | 2/1915 | Howland | 350/316 |
| 2,991,692 | 7/1961 | Korf | 350/315 |
| 2,997,389 | 8/1961 | Boon | 350/316 |
| 3,558,221 | 1/1971 | Jessup | 350/315 |
| 3,561,866 | 2/1971 | Cohen | 355/35 |

FOREIGN PATENT DOCUMENTS

67,726 of 7/1914 Austria .................. 350/315

*Primary Examiner*—Jon W. Henry
*Attorney, Agent, or Firm*—Burns, Doane, Swecker & Mathis

[57] ABSTRACT

A device for adjusting the composition of the spectrum of a light beam. At least one filter is adjustable at right angles to the axis of the light beam. The filter consists of two separate parts and means are provided for the joint stepwise moving of both filter parts to said axis and away from it. Thereby both filter parts are equidistant from the axis. The filter parts are moved stepwise so that the change of intensity of the light beam effected in each step remains substantially constant. The filter parts are connected to a stepping drive motor by means of traction cables the ends of which are guided over a respective cam plate which is torsionally connected to the axle of the drive motor. The cam plates have substantially the shape of a logarithmic spiral. Two spaced apart mounting plates are provided between which at least two, preferably three or four two-part filters, each with the traction cable belonging thereto, are arranged in different planes. The drive motors are positioned at the surfaces of the mounting plates.

11 Claims, 3 Drawing Figures device for adjusting the composition of the spectrum of a light beam using cam plates, traction cable arrangement The invention provides a device for adjusting the composition of the spectrum of a light beam with at least one filter which can be adjusted at right angles to an axis through which the axis of the light beam to be influenced passes when the device is in use. The principal field of use of such devices is colour printers, in which their function is to prepare the copying light in accordance with the respective exposure requirements.

In the known devices of this kind, three colour filters can be continuously swivelled from one side more or less deeply into the light beam, each colour filter being operated by a servomotor. This arrangement requires relatively large swivel paths, so that the amount of time needed for the positioning of the filters is proportionately long. Furthermore, the unsymmetrical lateral swivelling of the filters results in pronounced inhomogeneities in the light beam. These inhomogeneities require an intensive subsequent mixing, which in turn results in undesired losses of intensity.

A further considerable disadvantage is that a relatively complicated control mechanism for the servomotors is necessary for the exact positioning of the colour filters, especially whenever — as is usual with printers — a stepwise adjustment of the intensities of the individual parts of the spectrum of a light beam is to be effected.

Filters which are swivelled by servomotors often tend to oscillate about the desired position. This constant movement of the filters during copying causes the highly undesirable Schwarzschild effect to become even more pronounced, whilst the influence of the oscillations is dependent on the position of the filters and is not constant, so that there is no possibility of compensating for this undesirable effect by simple means.

Yet another disadvantage is that interference filters cannot be used automatically in known devices, since servomotors in this arrangement perform poorly on account of the cramped space available and are therefore not suitable to speed up the relatively heavy interference filters fast and exactly enough. Up to now, there has been no choice but to use the absorption filters which are less advantageous on account of, among other things, their short life.

It is the task of the present invention to avoid these disadvantages. According to the invention, this task is solved by the filter consisting of two separate parts and by providing driving means for the joint stepwise adjustment of both parts of the filter to and away from the above mentioned axis, with both parts of the filter being equidistant from said axis.

The invention is illustrated in more detail by means of a working example shown in the drawings.

Figure 1:
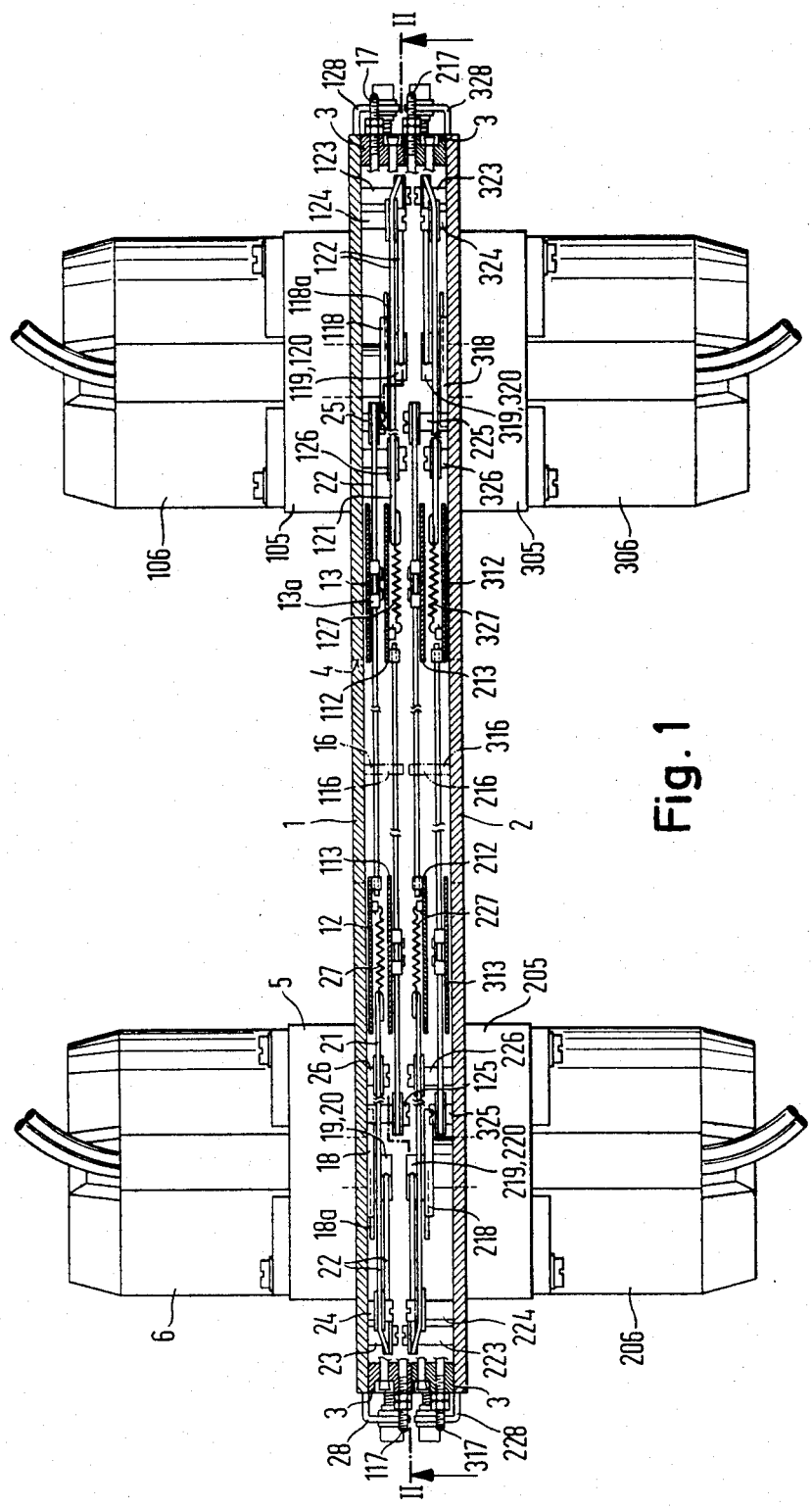
FIG. 1 shows a section through the working example perpendicular to the filter planes corresponding to line I—I of FIG. 2.

The device comprises two parallel mounting plates 1 and 2, which are kept at a reciprocal distance by means of spacer pieces positioned at their edges. The two plates are provided approximately in each of their centres with an aperture 4 (FIG. 2) through which, when in actual use, the light beam to be influenced in respect of the composition of its spectrum enters perpendicular to the plates. The centre of the aperture 4, through which the axis of the light beam then passes, is designated A.

Four stepping motors 6, 106, 206 and 306 are secured with their axes perpendicular to the plates two on each side of the apertures by means of intermediate rings 5, 105, 205 and 305 respectively at the surfaces of the mounting plates facing away from each other. Moreover, two of these motors 6, 206 and 106, 306 respectively at opposite sides of the apertures are coaxially aligned with each other.

The remaining parts of the device are accomodated in the hollow space between the two places. These parts are arranged into four similarly assembled filter systems which are independent of one another and arranged in planes parallel to one another, each of said filter systems being assigned to one of the stepping motors and comprising one filter consisting of two parts and a mechanism for moving the filter which establishes the contact with the stepping motor to which it is assigned. Two of the filter systems are assembled on the upper mounting plate of the drawing and the other two filter systems are assembled on the bottom mounting plate. The arrangement of the individual elements on the upper and bottom mounting plate is symmetrical in respect of a plane of symmetry passing between the two plates. The assembly and arrangement of the two filter systems, each of which is mounted on a common plate, is also symmetrical, namely in respect of a normal plane to the mounting plate passing through the line S-S- in FIG. 2. Since the four filter systems are completely identical in assembly and function (apart from their mutual symmetry), only one of these systems will be described in more detail hereinafter. Compared with the elements of the system described in detail, each of the corresponding elements of the remaining filter systems is provided with reference symbols greater by 100, 200 and 300 respectively.

Figure 2:
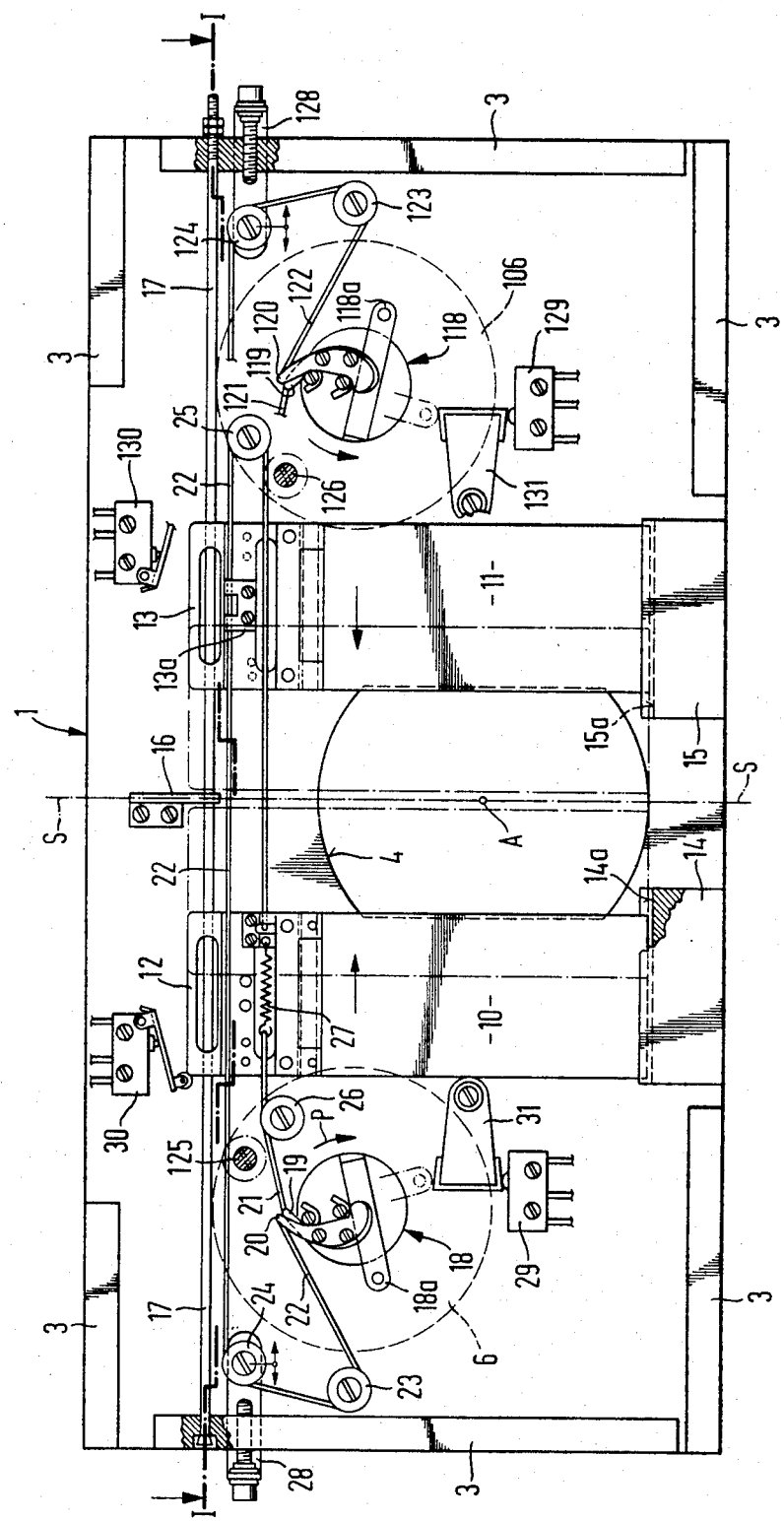
FIG. 2 shows a section according to the line II—II of FIG. 1.
Figure 3:
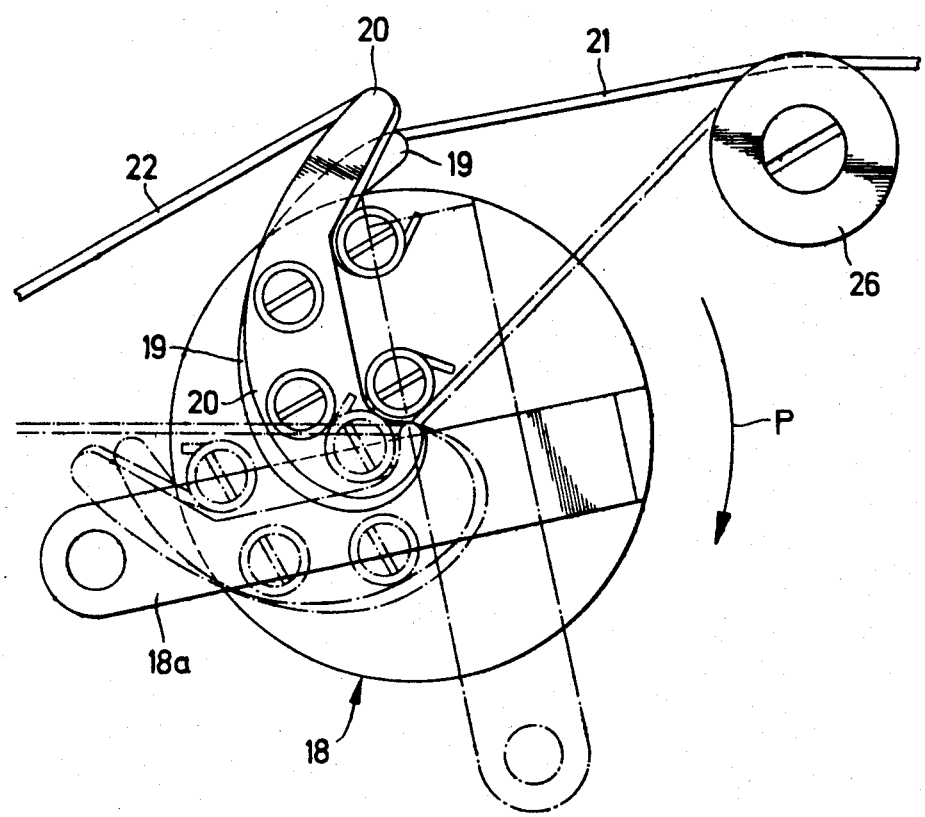
FIG. 3 shows a detail of FIG. 2 in enlarged form.

The assembly of the filter system closest to the mounting plate 1 can be clearly seen from the transverse section of the device shown in FIG. 2. It comprises substantially a filter consisting of two separate filter plates 10 and 11 and a mechanism for adjusting the filter plates. Each of these latter is clamped in a filter bracket 12 and 13 respectively at its one narrow side. Each of their adjacent narrow sides is guided into a groove 14a and 15a by two guide blocks 14 and 15. The filter brackets rest freely on a guide bar 17 which is mounted between two adjacent lateral spacer pieces 3 and supported in the centre by a support 16.

The operating or driving mechanism for the two filter plates 10 and 11 comprises a disc 18 which is keyed onto the axle (not visible) of the stepping motor 6 with two cam plates 19 and 20 secured thereon, and a cable line conisting of two traction cables 21 and 22 and guided over four guide pulleys 23-26. The shorter cable 21 is secured with its one end approximately in the centre of the disc 18, looped about the one cam plate 19 and made fast with the other end over a tension spring 27 at the filter bracket 12. The longer cable 22 is secured with its one end in the proximity of the edge of the disc 18, runs from there directly to the outward end of the other cam plate 20 and over the guide pulleys 23, 24 and 25 to the filter bracket 12, where it is fixed with its other end. The second filter bracket 13 is clamped by means of a holdfast at the reach of the cable 22 extending between the guide pulleys 24 and 25. The guide pulley 24 is adjustably mounted within certain limits by means of an adjusting element 28, whereby the tension of the cable can be regulated.

When the stepping motor 6 rotates in the direction of the arrow P, the cable 21 uncoils stepwise from the cam plate 19 and cable 22 simultaneously coils onto the cam plate 20. In this way, both filter plates 10 and 11 are moved symmetrically to the centre A of the aperture 4, which means that in actual operation they are pushed increasingly into the light beam entering through the aperture 4. By rotating the stepping motor in the opposite direction, both filter plates are correspondingly moved apart from each other again.

Two microswitches 29 and 30 are provided to restrict the adjusting movement of the two filter plates 10 and 11. The final position of greatest distance between the filter plates shown by the solid line in FIG. 2 is detected by the switch 30 whose nipple rests against one edge of the filter bracket 12. The other final position indicated by the dotted line, in which the filter plates are closest to the centre of the aperture, is detected by the switch 29, which is actuated via a swivelling intermediate 31 by a switch lever 18a which extends away from the disc 18 approximately radially. Both microswitches are connected to a control means which is not shown and which stops the motor 6 when one of the above mentioned final positions is reached. the final position detected by the microswitch 29 is advantageously so determined with regard to as short copying times as possible that the two filter parts are at a certain minimum distance from the centre of the aperture.

FIG. 2 shows in detail the disc 18 with the cam plates 19 and 20 secured thereon and the guide and fixing of the traction cables 21 and 22. The solid line representation corresponds to that rotating position of the stepping motor in which the filter plates assume the final position first mentioned with the maximum reciprocal distance between them.

The dotted line representation corresponds to the final position. The maximum angle of rotation of the stepping motor is approximately 270°.

Three of the four two-part filters (10, 11, 110, 111, 210, 211, 310, 311) are subtractive or additive color filters, preferably interference filters, whilst the fourth is advantageously a grey filter or any other neutral coloured attenuator pad, for example a comb filter or the like. In this way, not only the composition of the spectrum but also the intensity of a light beam can be very easily influenced.

As already mentioned at the outset, it is customary in the art of copying to adjust stepwise the intensity of the copying light with respect to the individual colour components. In doing so, it is endeavoured to keep the relative adjustment of the intensity constant from step to step. Whereas complicated control mechanisms have hitherto been necessary for the purpose, it can now be accomplished in very simple manner with the device of the present invention by designing the cam plates 19 and 20 correspondingly. To this end, the cam plates must have substantially the shape of a so-called logarithmic spiral, which is defined by the equation $r(\varphi) = r_0 \cdot e^{k\varphi}$. At the same time, it is advisable that the aperture should have a somewhat flattened shape as illustrated and not a circular one. In this way, the relative adjustment of intensity from step to step can be attained over the entire aperture cross-section. With a circular aperture it would only be possible to so by much more complicated technical means.

In a practical working example, the cam plates 19 and 20 had a shape given by the equation $$r(\varphi) = r_0 \cdot e(\varphi/100°)$$

wherein $r_0 = 1$mm and $\varphi$ is from 0° to 270°.
The stepping motor 6 was so designed that is carried out 72 steps for an angular field of 270°. The aim was a relative intensity adjustment of 0.02 per step. It has been demonstrated that this value was fulfilled virtually over the whole aperture within permissible limits of tolerance.

I claim:

1. A device for adjusting the composition of the spectrum of a light beam with at least one filter adjustable at right angles to an axis through which the axis of the light beam to be influenced passes, wherein the filter consists of two separate parts (10, 11) and wherein means are provided for the joint stepwise moving of both filter parts being equidistant from the axis; and said means for moving the filter parts comprising a stepping motor (6), two cam plates (19, 20) which are connected torsionally to the axle of said stepping motor, and a traction cable (21, 22), each end of the cable being guided over one of the cam plates and in counter-rotation coiling onto and uncoiling from said cam plates.

2. A device according to claim 1, wherein the relative difference in the intensity of the light beam effected by moving both filter parts is substantially the same for each step.

3. A device according to claim 1, wherein the profile of the cam plates (19, 20) has substantially the shape of a logarithmic spiral.

4. A device according to claim 1, wherein both filter parts are interference filters.

5. A device according to claim 1, wherein one edge of each of the two filter parts is guided into a guide groove (14a, 13a) and rests freely gliding on a sliding support, said edges being adjacent to the guide grooves.

6. A device according to claim 1, wherein an aperture is provided whose centre lies in the axis (A) and whose contour is composed of two parallel straight lines of equal length which fall perpendicular to the direction of movement of the filter parts and of two arcs which join these straight lines.

7. A device according to claim 1 wherein two mounting plates are provided which are parallel to each other at a reciprocal distance and each having an aperture, and wherein at least two two-part filters, each connected to a means for moving its filter parts are arranged in different planes between said mounting plates.

8. A device according to claim 7 wherein four two-part filters, each connected to a means for moving its filter parts, are arranged in diffferent planes between said mounting plates.

9. A device according to claim 8 wherein the stepping motors assigned to the individual filters are positioned at the surfaces of the mounting plates and the stepping motors are coaxially adjacent to each other in pairs.

10. A device according to claim 8 wherein two filters with their respective moving means are assembled in pairs completely on a mounting plate.

11. A device according to claim 8, wherein one filter is constructed as a neutrally coloured attenuator pad.

* * * * *